Dec. 16, 1958   J. W. POULTER ET AL   2,864,475
POWER CONTROL MECHANISM FOR POWER CLUTCHES
Filed Oct. 30, 1956   5 Sheets-Sheet 1

INVENTORS
John W. Poulter
Philip Huffaker
F. D. Graham

BY
ATTORNEY

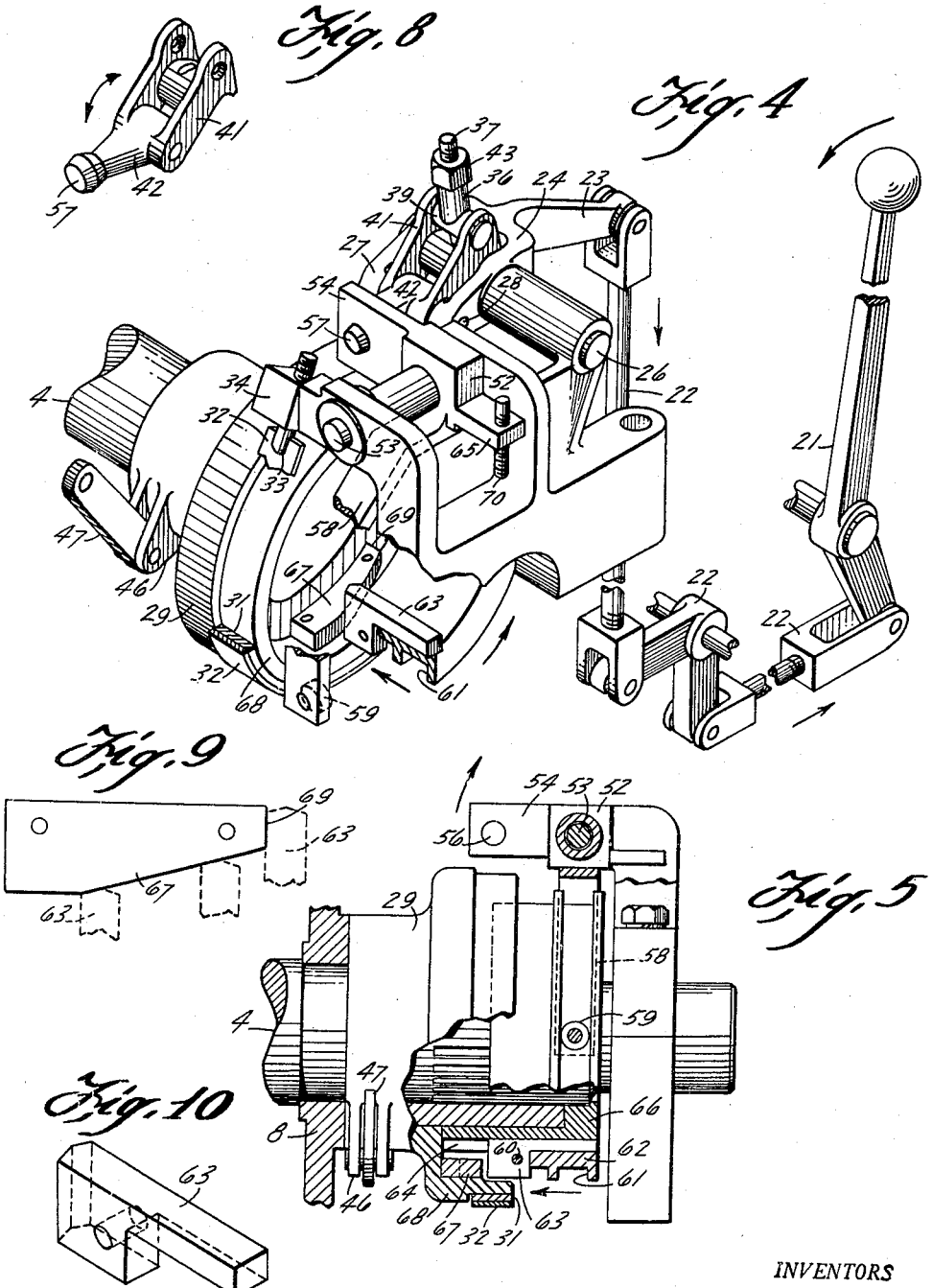

Dec. 16, 1958  J. W. POULTER ET AL  2,864,475
POWER CONTROL MECHANISM FOR POWER CLUTCHES
Filed Oct. 30, 1956  5 Sheets-Sheet 3
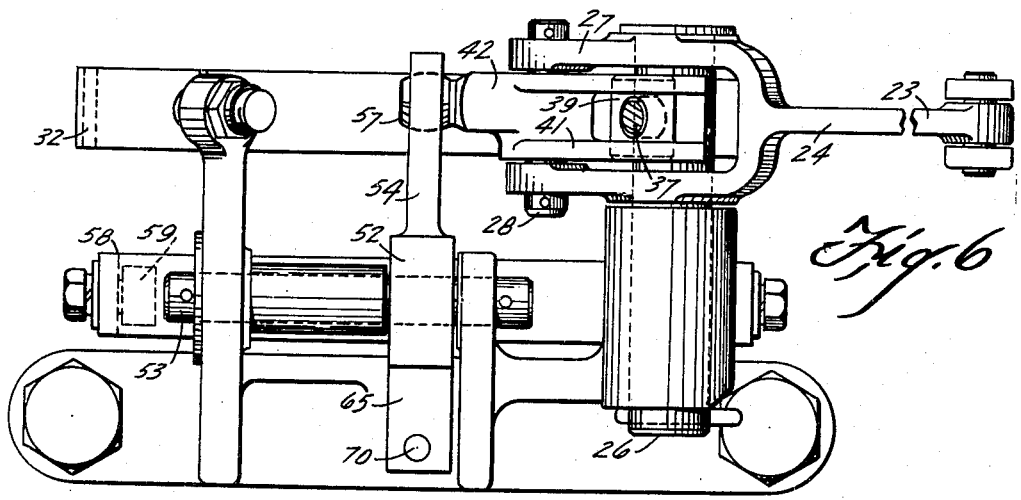
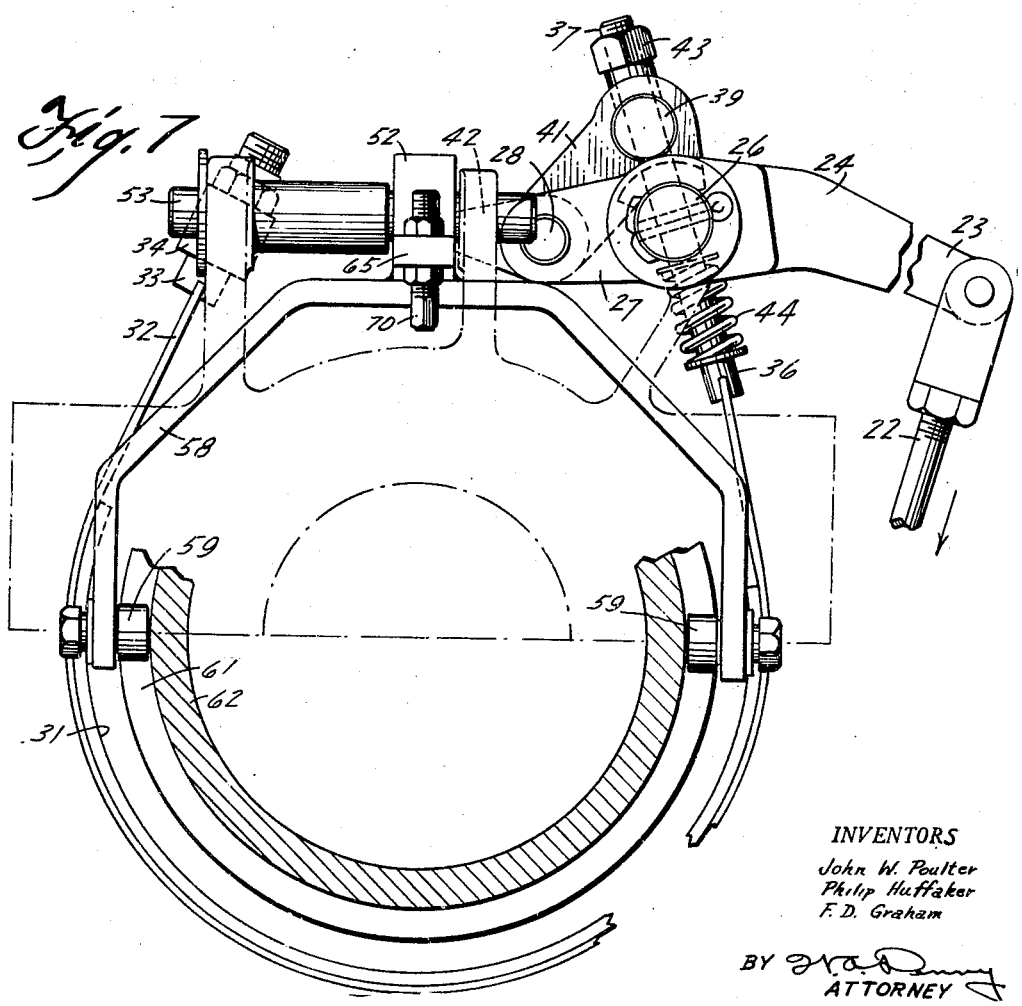
INVENTORS
John W. Poulter
Philip Huffaker
F. D. Graham
BY
ATTORNEY Dec. 16, 1958 J. W. POULTER ET AL 2,864,475
POWER CONTROL MECHANISM FOR POWER CLUTCHES
Filed Oct. 30, 1956 5 Sheets-Sheet 4

INVENTORS
John W. Poulter
Philip Huffaker
F. D. Graham

BY *W.O. Denny*
ATTORNEY

Dec. 16, 1958 J. W. POULTER ET AL 2,864,475
POWER CONTROL MECHANISM FOR POWER CLUTCHES
Filed Oct. 30, 1956 5 Sheets-Sheet 5
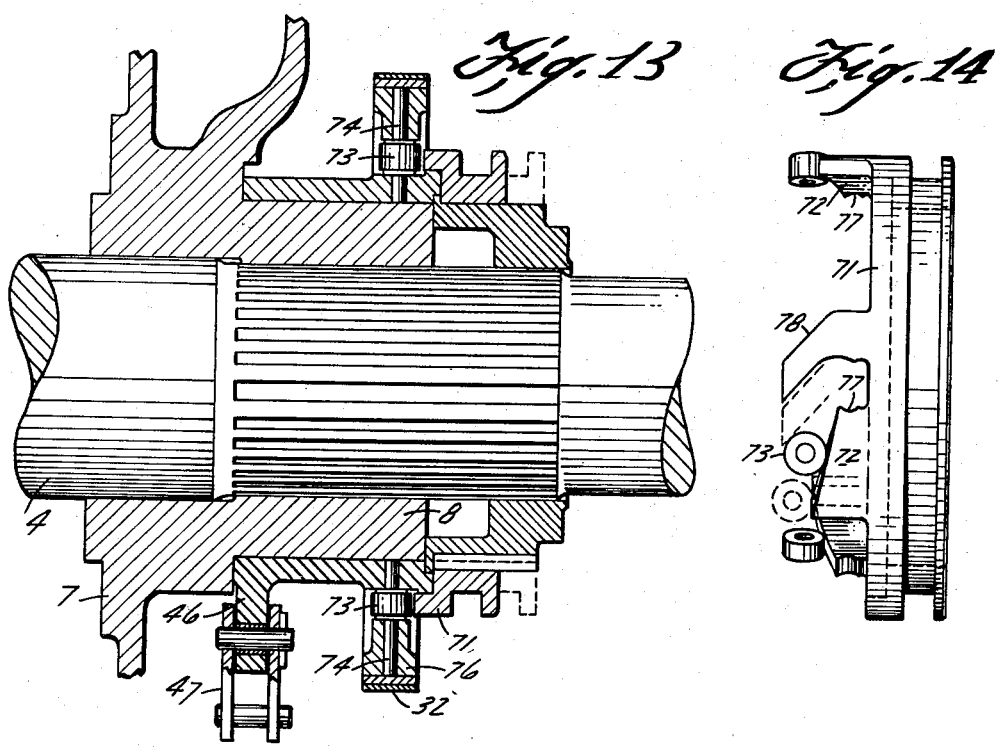
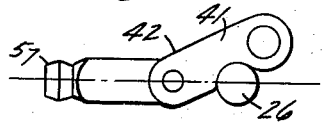
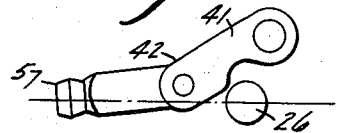
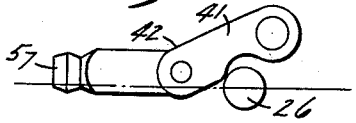
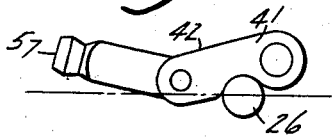
INVENTORS
John W. Poulter
Philip Huffaker
F. D. Graham
BY
ATTORNEY

United States Patent Office 2,864,475
Patented Dec. 16, 1958

2,864,475

POWER CONTROL MECHANISM FOR POWER CLUTCHES

John W. Poulter, Wauwatosa, Wis., Philip A. Huffaker, Chattanooga, Tenn., and Frederick Dwight Graham, Milwaukee, Wis., assignors to Koehring Company, Milwaukee, Wis., a corporation of Wisconsin Application October 30, 1956, Serial No. 619,258

23 Claims. (Cl. 192—36)

This invention relates generally to clutches and more specifically to a power control mechanism for heavy duty power clutches of the type employed in material handling equipment such as cranes, shovels and draglines.

In power cranes, shovels and equipment of the type designed for high capacity loads, the clutches employed therein are subjected to operating conditions that impose difficult requirements for satisfactory service. Because of the high torques, the main clutches are usually power clutches actuated by electric, pneumatic, hydraulic or mechanical booster means. One of the most important requirements of a power clutch is the provision of power assist means which leaves the machine operator a sense of "feel" of the load, resulting in better control of the machine and an appreciation of the strain that the machine is being subjected to. The operator is believed to have a "feel" of the load when the distance the manual control lever is moved and the effort exerted on the lever is proportional to the degree of clutch engagement. Another requirement of the power clutch is that the speed of engagement of the clutch be automatically controlled to prevent subjecting the machine to shock loading and strain resulting from suddenly applied loads and impacts.

In United States Patent No. 2,484,811, issued to R. A. Beckwith, there is shown a power clutch having a mechanical power amplification means utilizing the power from the driving motor to develop an amplification of the force applied to the lever by the operator. This results in materially reducing the effort expended by the operator in effecting clutch engagement. Although the clutch mechanism of Beckwith accomplishes the foregoing objectives, the power control device used therein contains many parts of complicated configuration requiring considerable space and adding to the weight and complexity of the unit. The clutch parts involved therein, particularly the gears, are costly and difficult to assemble. Furthermore, the wearing of the gear teeth results in the development of a considerable amount of "play" between respective mating gear teeth. This necessitates undesirably frequent adjustments and gear replacements during the operation of the machine. It is believed that applicants' improved clutch power control means is designed to operate on a different principle and with a different mode of operation to eliminate the disadvantage of the Beckwith power control device.

It is therefore an object of the present invention to provide for a clutch an improved power control mechanism that is more compact, more economically produced and of simpler design than prior known power control devices.

Another object of the invention is the provision in a power clutch of improved mechanical means utilizing the power from a constantly driven power member to amplify the effort applied to the manual control lever by the operator.

Another object of the invention is to provide an improved power clutch mechanism that eliminates the need of the operator to maintain hand pressure on the control lever after the clutch is fully engaged.

A further object of the invention is the provision of an improved and simplified power clutch mechanism which in the fully engaged position eliminates the need of maintaining engagement of a booster band against a booster drum.

Another object of the invention is the provision of power control means in conjunction with the mechanical amplifying mechanism which permits the operator to maintain manual lever control over the rotative movement of the clutch brake drum during the entire period the clutch is being engaged.

Another object of the invention is the provision of an improved and simplified mechanical power clutch having auxiliary means for effecting clutch disengagement.

Objects and advantages other than those set forth above will be apparent from the following description when read in connection with the accompanying drawings, in which:

Fig. 4 is a perspective view illustrating one embodiment of the improved mechanical power clutch control mechanism with a portion broken away;

Fig. 5 is a side elevation view of a portion of the structure of Fig. 4 with a part thereof broken away and sectioned;

Fig. 6 is a plan view of the embodiment of the invention shown in Fig. 4;

Fig. 7 is a side elevation view of the structure of Fig. 6 with a portion thereof broken away;

Fig. 8 is a perspective view of one part of the mechanism shown in Figs. 4, 5, 6 and 7;

Fig. 9 is a plan view of another part of the embodiment shown in Fig. 4 and illustrates by dotted lines various positions of a cam follower with respect to a cam;

Fig. 10 is an enlarged perspective view of the cam follower appearing in Figs. 4 and 5.

Fig. 13 is a fragmentary section view of a portion of the structure illustrated in Fig. 11;

Fig. 14 is a side elevation view of a portion of the structure illustrated in Fig. 13; and Figs. 15 through 18 are side elevation views illustrating various operating positions of one part in the embodiments of the invention disclosed.

Figure 1:
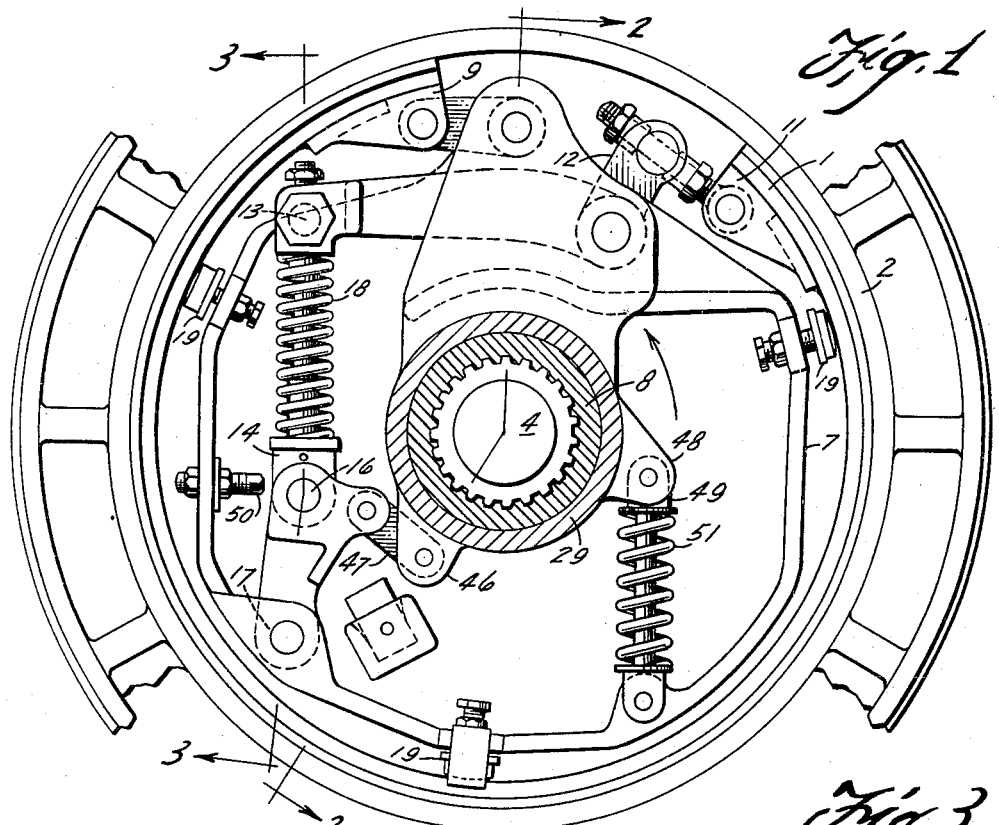
Fig. 1 is a side elevation view of the clutch engaging parts of a toggle type clutch unit.
Figure 3:
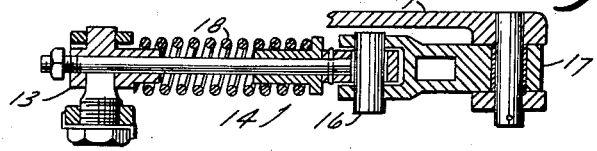
Fig. 3 is a section view taken along line 3—3 of Fig. 1.
Figure 2:
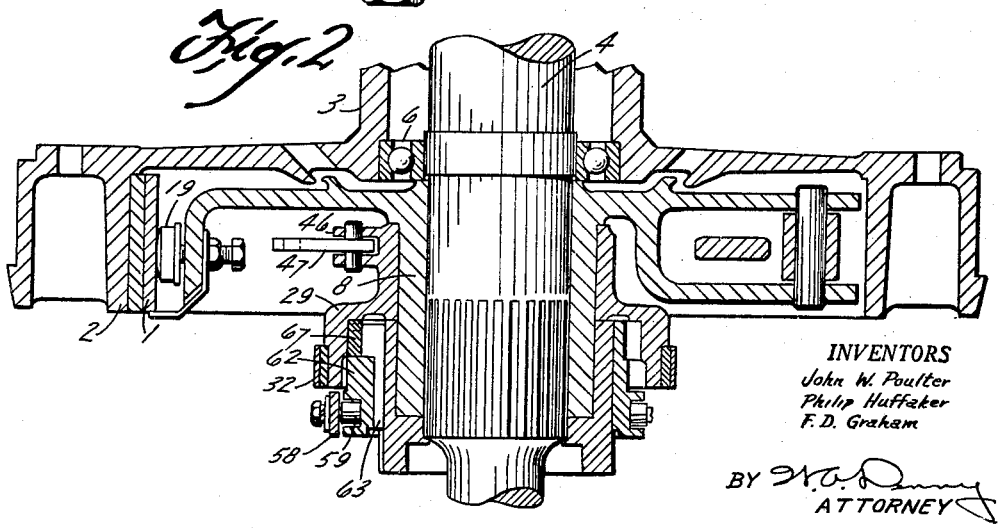
Fig. 2 is a section view taken along line 2—2 of Fig. 1.
Figures 11, 12:
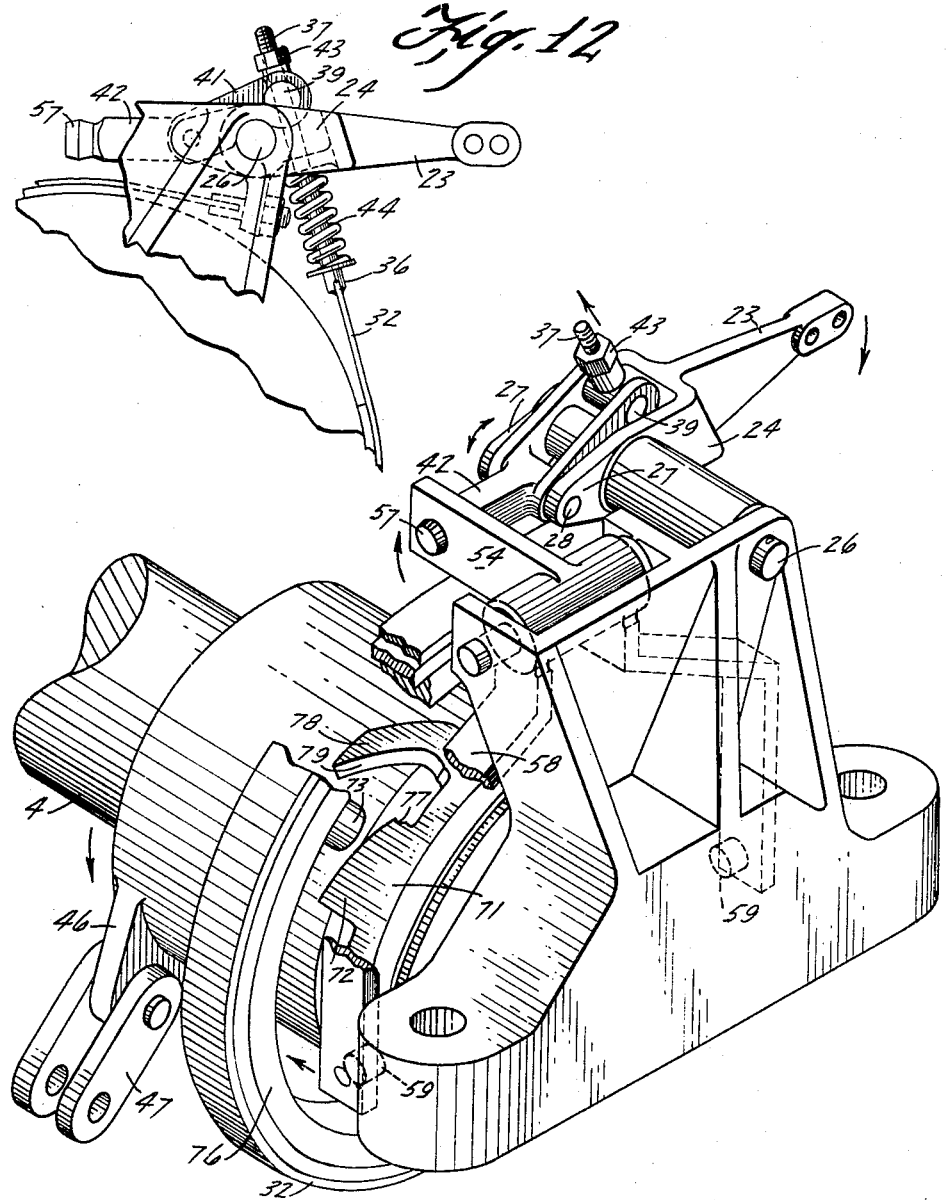
Fig. 11 is a perspective view somewhat similar to Fig. 4 illustrating a modification of the invention.
Fig. 12 is a fragmentary side elevation view of a portion of the structure illustrated in Fig. 11.

As shown in the drawings, the invention is illustrated as applied to a mechanically controlled power clutch mechanism of the type having an internal expanding main clutch band 1 adapted to engage the inner surface of a clutch drum 2 or driven member. The clutch drum 2 is integrally connected to a portion 3 of a cable drum (not shown) which is rotated by application of the power clutch to wind a cable disposed thereon for raising loads or performing other operations. The clutch drum 2 is mounted on a power shaft 4 or driving element by bearings 6, only one of which is shown, and the power clutch is interposed between the drum 2 and the driving element 4 to drivingly connect one to the other. The driving element 4 is normally rotated at a relatively constant, low angular velocity in revolutions per minute (R. P. M.) by some suitable power means, not shown.

The clutch engaging parts comprise a clutch spider 7 having a hub 8 splined to the driving element 4 and rotatable therewith. The clutch band 1 has one end 9 secured or dead ended on the spider 7 and the free or live end 11 connected to a lever 12 which in turn is connected to one end 13 of a clutch engaging toggle 14 having a pin 16 intermediate its ends. The opposite end 17 of the toggle is pivoted on the spider 7. A compensator spring 18 is carried by the toggle link 14 to automatically adjust the clutch parts to compensate for any expansion or contraction of the clutch drum 2 diameter resulting from heat generated in working operation and subsequent cooling thereof. Carrier button assembly units 19 are mounted on the spider 7 for carrying the clutch band 1 and determining its clearance during the disengaged period of the clutch.

Now referring to Fig. 4, the manual control system for the clutch comprises a control lever 21 connected by suitable linkage 22 to one end 23 of an arm 24 pivotal intermediate its ends on a shaft 26. The opposite end 27 of the arm 24 is bifurcated and carries a pin 28 for actuating the power control mechanism to be explained hereinafter.

The mechanical amplification mechanism provided to develop an amplification of the effort exerted by the operator on the manual control lever 21 by utilizing power from the driving element 4 includes a booster drum 29 rotatably mounted on the hub 8 of spider 7. A brake lining 31 surrounds the booster drum 29 and is attached to a brake band 32 which has one end 33 dead ended on a stationary frame 34. The opposite end 36 of the brake band 32 forms a stud 37 passing through an opening, as seen in Fig. 7, formed by the shaft 26 carried by the frame 34, and an opening formed by a pin 39. The pin is carried by a forked end 41 of a differential lever 42 the functioning of which is to be explained hereinafter. A nut 43 is threaded on the stud 37 for adjusting the tension of the brake band 32 against the bias of a spring 44.

The drum 29 is provided with a lug 46 connected to the toggle 17 by a link 47. Another lug 48 is connected to the spider 7 by an extensible spring carrier 49 and a spring 51. The spring 51 acts to hold the drum 29 and the spider 7 in the clutch disengaged position. The rotation of the spider 7 by the drive shaft 4 drags the drum 29 along at the same angular velocity. Thus it will be seen that by retarding or momentarily stopping the drum 29 with the brake band 32 there is provided a resistance to the continuing rotation of the spider 7 causing the toggle link 17 to push against the lug 46 through the link 47. This results in a straightening of the toggle linkage 14 and 17 and engagement of the main clutch band 1 with the clutch drum 2 against the bias of the spring 51. The set screw 50 is carried by the spider 7 and is adjusted to prevent the toggle linkage 14 and 17 from going into backlock, that is, going over-center.

The power control mechanism comprises the mechanical parts which coact to keep the power developed by the driving member 4 from controlling or "taking over" the clutch engagement process. By utilizing a power control mechanism, the operator is able to maintain direct manual lever control over the rotative movement of the booster brake drum 29. The power control mechanism illustrated in Figs. 1 through 10 includes an inverted shifting-fork member 52 pivotal about a shaft 53 disposed at the junction of the legs of the fork. The fork includes an operating extension 54 provided at one end with an opening 56 for receiving one end 57 of the differential lever 42. The lever 42 is pivotally mounted intermediate its ends to the pin 28. The legs 58 of the member 52 are provided at their ends with rotatable rollers 59 adapted to ride in a peripheral groove 61 formed in cylindrical sleeve member 62. The sleeve 62 is provided with a combined key and cam follower 63 which is secured thereto by a pin 60. The bottom half of the follower fits into an axial slot formed in the sleeve 62 and the top half is received by a corresponding axial slot 64 formed in cylindrical member 66. A portion of the bore of the cylindrical member 66 is rotatably mounted on the hub 8 and the remaining portion is splined to the drive shaft so that the follower 63 is held in fixed angular relationship to the spider 7. A flange 65 carrying a set screw 70 is provided on the fork 52 for limiting pivotal movement thereof in one direction, and corresponding movement of the sleeve 62 in an axial direction.

The drum 29 is further provided with an arcuate cam member 67 mounted on the inner surface of a flange 68. Upon angular displacement of the drum 29 with respect to the spider 7, such as occurs when the brake band 32 retards the rotation of the drum 29, the sleeve 62 and follower 63 are permitted to be moved axially inwardly by the fork or yoke 58 as the cam follower 63 engages and follows the slope of the cam member 67. When the cam follower 63 reaches the end of its travel on the cam member 67, it may be moved axially inwardly along the edge 69 of the cam member 67, as shown in Fig. 9, to latch the booster drum 29 against movement in the clutch disengaging direction. Thus the clutch may be left in the fully engaged condition without necessity of effort on the handle 21. The factors determining the slope of the cam are the length of the yoke 58 from the pivot to the axis of the drive shaft 4, the length of the bar 54 from the pivot to the center of the opening 56, the desired vertical travel of the end 57 of the lever 42, and the angular rotation of the drum 29 required to move the clutch between fully disengaged and fully engaged positions. In the embodiment illustrated in Figs. 1–10, a slope of about 15 degrees from normal to the shaft 4 has been found to be quite satisfactory.

In the modification of the invention shown in Figs. 11, 12, 13 and 14 a plurality of cams and followers are used and their relative positions are reversed. The cylindrical sleeve 71 has a plurality of circumferentially spaced cam members 72 formed integrally therewith. The corresponding circumferentially spaced cam followers comprise rotatable rollers 73 mounted on pins 74 carried by the booster brake drum 76. When the rollers 73 reach the end of their travel on the cam members 72, the cam members may further more axially until the arcuate recesses 77 formed by the edges of the cam members 72 receive the rollers 73 to lock the clutch in the engage position.

The sleeve 71 is further provided with a safety clutch release feature shown as a finger 78 having a camming edge 79 for forcibly camming at least one of the cam followers 73 in a direction to move the booster drum 76 to the clutch disengaging position. The slope for the edge 79 is approximately 45 degrees from normal to the clutch axis to impart maximum torque to the booster drum. Thus, if upon reverse movement of the manual control lever the clutch fails to automatically move to the disengaged position because of improper adjustment of the backlock set screw or other reason, manual effort applied to the control lever will be imparted by means of the shifting fork 58 to the sleeve 71 to force the booster drum and associated mechanism to the disengaged position.

In describing the operation of the clutch mechanism illustrated in Fig. 4, let us assume initially that the drive shaft 4, clutch engaging parts, booster drum 29 and cylindrical sleeve 62 are all rotating in the direction of the arrow, and at the same constant angular velocity with the manual control lever 21 in a neutral or clutch disengaged position. The differential lever 42 would be in the position shown in Fig. 15. To engage the clutch, the operator pulls the lever 21 counterclockwise as seen in Fig. 4 transmitting a downward force on one end 23 of the arm 24 which pivots about the shaft 26 causing the spindle 28 at its other end 27 to exert an upward force on the pivotal point of the differential lever 42. Initially both ends 41, 57 of the differential lever 42 move upwardly until the cam follower 63 of the sleeve 62 engages the cam member 67 at which time the end 57 of the differential lever 42 becomes fixed and serves as a fulcrum point. The pin 39 carried by the other end 41 of the lever is forced to move upwardly as shown in Fig. 16 exerting a force on the live end 36 of the brake band 32 and tightening the band to apply a frictional retarding force to the booster drum 29. This force tends to reduce the angular velocity or momentarily stop the rotation of the booster drum 29. The continued rotation of the spider 7 and drive shaft 4 at the constant angular velocity causes the spider 7 to run ahead of the booster drum 29 resulting in a relative angular displacement between the two. This relative displacement results in a force being exerted on the lug 46 and link 47 as seen in Fig. 1 which acts to straighten out the toggle links 14 and 17 and effect a corresponding clutch application of the clutch band 1 to the clutch drum 2. Since a proportional part of the hand lever force at pin 27 is constantly acting upwardly on lever 54, any rotational movement of cam follower 63 down the slope of cam 67 permits and creates an upward movement of lever 57 and a corresponding downward movement of pin 39. It is this feed-back from the axially moving cam follower 63 that causes a releasing of the tension on the booster brake band 32. This coaction between the cam member 67, cam follower 63 and differential lever 42 gives the operator almost direct manual control over the rotational movement of the booster brake drum 29 and consequently over the degree of clutch engagement. In doing this it provides a power control that automatically prevents from taking over control the power utilized from the driving shaft 4 for actuating the clutch engaging parts. The operator only has to exert pressure on the manual lever 21 until he obtains the desired clutch engagement. When the clutch is fully engaged, the cam follower 63 moves axially inwardly along the edge 69 of the cam member 67 to lock the clutch by preventing the drum 29 from returning to its original position with respect to the spider 7 and sleeve 62 as urged by the spring 51 and the brake band and toggle. At this point the operator may completely remove his hand from the control lever, the differential lever 42 having taken the position shown in Fig. 18, in which position it will remain until the control lever is moved in the clutch disengaging position.

To release the clutch mechanism the manual control lever 21 is moved clockwise as seen in Fig. 4 causing the end 23 of the arm 24 to move upwardly and the opposite end 27 downwardly to a downward force on the differential lever 42. The end 41 of the differential lever 42 seats upon the shaft 26 which acts as a fulcrum causing the other end 57 of the lever 42 to exert a downward force on the bar 54. This downward force causes the bar 54 to pivot and move the yoke 58 to apply a force on the sleeve 62 moving the sleeve axially outwardly until the cam follower 63 is withdrawn past the edge 69 of the cam member 67. The spring 51 and the associated toggle mechanism 14 then urges the booster drum 29 rotationally in a direction to release the main clutch band 1 from the clutch drum 2, the degree of clutch engagement, of course, being at all times proportional to the amount of travel of the manual control lever 21 as long as the cam follower 63 is not permitted to move past the locking end 69 of cam 67.

It is to be understood that it is not intended to limit the invention to the exact details of construction herein set forth for purposes of illustration as various modifications falling within the scope of the appended claims may occur to persons skilled in the art.

It is claimed and desired to secure by Letters Patent:

1. In a clutch mechanism for drivingly connecting a rotating driving element to a driven member, the combination of: clutch engaging parts connected to and rotatably driven by said driving element; a rotatable member connected to said clutch engaging parts for rotation therewith; resilient means for holding said rotatable member and said clutch engaging parts in a clutch disengaged position; means for retarding said rotatable member for reducing the angular velocity of said member so that the angular displacement of said member with respect to said clutch engaging parts actuates said clutch engaging parts against the bias of said resilient means to effect clutch engagement; and control means including cam means coacting with said rotatable member for effecting release of said retarding means at any desired position in the angular displacement of said rotatable member and holding said rotatable member in said position against the bias of said resilient means.

2. In a clutch mechanism for drivingly connecting a rotating driving element to a driven member, the combination of: clutch engaging parts connected to and rotatably driven by said driving element; a rotatable member connected to said clutch engaging parts for rotation therewith; resilient means for holding said rotatable member and said clutch engaging parts in a clutch disengaged position; means for retarding said rotatable member for reducing the angular velocity of said member so that the angular displacement of said member with respect to said clutch engaging parts actuates said clutch engaging parts against the bias of said resilient means to effect clutch engagement; manual means for actuating said retarding means; and means for controlling the actuation of the retarding means including cam means movable upon angular displacement of said rotatable member with respect to said clutch engaging parts for effecting deactuation of said retarding means.

3. In a clutch mechanism for drivingly connecting a rotating driving element to a driven member, the combination of: clutch engaging parts connected to and rotatably driven by said driving element; a rotatable drum connected to said clutch engaging parts for rotation therewith; resilient means for holding said rotatable drum and said clutch engaging parts in a clutch disengaged position; retarding means cooperable with said drum for reducing the angular velocity of said drum so that the angular displacement of said drum with respect to said clutch engaging parts actuates said clutch engaging parts against the bias of said resilient means to effect clutch engagement; a cam member carried by said drum; and control means for said retarding means including a cam follower adapted to follow said cam member and effect release of said retarding means from said drum upon termination of relative movement between said cam member and said cam follower.

4. In a clutch mechanism for drivingly connecting a driving element rotating at a relatively constant angular velocity to a driven member, the combination of: clutch engaging parts connected to and rotatably driven by said driving element; a rotatable drum connected to said clutch engaging parts for rotation therewith; resilient means for holding said rotatable drum and said clutch engaging parts in a clutch disengaged position; retarding means coacting with said drum for reducing the angular velocity of said drum so that the angular displacement of said drum with respect to said clutch engaging parts actuates said clutch engaging parts against the bias of said resilient means to effect clutch engagement; an axially movable cylindrical sleeve rotatably driven by said driving element; a cam follower carried by said sleeve and coacting with said retarding means; a cam member carried by said drum; and means for urging said sleeve and said cam follower axially with said cam follower following said cam member and simultaneously releasing said retarding means whereby the operator is able to maintain reactionary control over the rotative movement of the rotatable drum during the entire period of clutch engagement.

5. In a clutch mechanism for drivingly connecting a driving element rotating at a relatively constant angular velocity to a driven member, the combination of: clutch engaging parts connected to and rotatably driven by said driving element; a rotatable drum connected to said clutch engaging parts for rotation therewith; resilient means for holding said rotatable member and said clutch engaging parts in a clutch disengaged position; retarding means coacting with said drum for reducing the angular velocity of said drum so that the angular displacement of said drum with respect to said clutch engaging parts actuates said clutch engaging parts against the bias of said resilient means to effect clutch engagement; an axially movable cylindrical sleeve rotatably driven by said driving element and having a peripheral groove; a pivotal L-shaped member having a portion forming a yoke partially encircling said sleeve, said yoke having cam means adapted to ride in said groove; a lever pivotal about a point intermediate its ends and having one end connected to another portion of said L-shaped member and the other end connected to said retarding means; a cam member carried by said drum; a cam follower carried by said sleeve; and manual means adapted to exert a force on said lever at its pivot point actuating said retarding means causing said drum to be angularly displaced with respect to said sleeve, said retarding force pivotally urging said lever about its pivot point to release said retarding means as said sleeve and cam follower are moved by said L-shaped member axially inwardly following said cam member.

6. In a clutch mechanism for drivingly connecting a rotating driving element to a driven member, the combination of: clutch engaging parts connected to and rotatively driven by said driving element; a rotatable member connected to said clutch engaging parts for rotation therewith; resilient means for holding said rotatable member and said clutch engaging parts in a clutch disengaged position; retarding means coacting with said rotatable member for reducing the angular velocity of said member so that the angular displacement of said member with respect to said clutch engaging parts actuates said clutch engaging parts against the bias of said resilient means to effect clutch engagement; and power control means coacting with said retarding means and said rotatable member whereby the operator is able to maintain direct control over the rotative movement of the rotatable member during the entire period of clutch engagement, said control means including cam locking means for automatically holding said rotatable member and said clutch engaging parts in any position of clutch engagement against the bias of said resilient means when said retarding means is released.

7. The combination of claim 6 wherein said locking means comprises a cam member carried by said rotatable member, said cam member having a slope terminating in an edge; a cam follower carried by said power control means adapted to follow said slope of said cam member as said rotatable member is angularly displaced with respect to said power control means, said cam follower moving axially inwardly along said edge of said cam member so said clutch becomes fully engaged to effectively lock said rotatable member and said power control means in a fully clutch engaged position against the bias of said resilient means, and to release said retarding means.

8. The combination of claim 6 wherein said power control means includes a cylindrical sleeve rotatably driven by said driving element and axially movable therewith; and said locking means comprises a cam member carried by said rotatable member, said cam member having a slope terminating in an edge, a cam follower carried by said sleeve adapted to follow said slope of said cam member as said rotatable member is angularly displaced with respect to said sleeve, said cam follower moving axially inwardly along said edge of said cam member as said clutch becomes fully engaged to effectively lock said rotatable member and said sleeve in a fully clutch engaged position against the bias of said resilient means and to release said retarding means.

9. The combination of claim 8 wherein said sleeve has a peripheral groove and said power control means further comprises a lever pivotal intermediate its ends and having one end connected to said retarding means; and an inverted L-shaped pivotal member having one portion forming a yoke partially surrounding said sleeve, said yoke having cam means adapted to ride in said groove for axially urging said sleeve toward said rotatable member, and the other portion of said L-shaped member adapted to actuate the other end of said lever.

10. The combination of claim 8 wherein the retarding means comprises a brake band surrounding said first member.

11. In a clutch mechanism for drivingly connecting a driving element rotating at a relatively constant angular velocity to a driven member, the combination of: clutch engaging parts connected to and rotatably driven by said driving element; a first rotatable member connected to said clutch engaging parts for rotation therewith; resilient means for holding said first member and said clutch engaging parts in a clutch disengaged position; retarding means coacting with said first member for reducing the angular velocity of said member so that the angular displacement of said member with respect to said clutch engaging parts actuates said clutch engaging parts against the bias of said resilient means to effect clutch engagement; a second cylindrical member rotatably driven by said driving element, said first and second members being axially movable with respect to one another, and one of said first and second members coacting with said retarding means; a cam follower carried by one of said first and second members; a cam member carried by the other of said members; and means for urging one of said first and second members axially toward the other of said members with said cam follower following said cam member and simultaneously releasing said retarding means whereby the operator is able to maintain direct control over the rotative movement of the rotatable drum during the entire period of clutch engagement.

12. The combination of claim 11 wherein the last named means comprises a differential lever pivotal intermediate its ends and having one end connected to said retarding means; and an inverted L-shaped pivotal member having one portion forming a yoke adapted to axially move one of said members, and the other portion adapted to actuate said other end of said differential lever.

13. In a clutch mechanism having a rotating driving element, a rotatable drum connected to said driving element for rotation therewith, and retarding means coacting with said drum to angularly displace said drum with respect to said driving element, an improved power control mechanism comprising: a cam member carried by said drum; a cam follower carried by said driving element and axially movable into engagement with said cam member; and means for axially moving said cam follower in a direction to follow said cam member as said drum is angularly displaced with respect to said driving element by said retarding means, and for simultaneously releasing said retarding means to release said drum.

14. The combination of claim 13 wherein the last named means comprises a lever pivotal intermediate its ends and having one end connected to said retarding means; and an inverted L-shaped pivotal member having one portion forming a yoke adapted to axially move said driving element, and the other portion adapted to actuate said other end of said lever.

15. The combination of claim 13 wherein the last named means comprises a cylindrical sleeve driven by said driving element and axially movable therewith, said sleeve having a peripheral groove; a lever pivotal intermediate its ends and having one end connected to said retarding means, and an inverted L-shaped pivotal member having one portion forming a yoke partially surrounding said sleeve, said yoke having cam means adapted to ride in said groove for axially urging said sleeve toward said rotatable drum, and the other portion of said L-shaped member adapted to actuate the other end of said lever.

16. In a clutch mechanism having a rotating driving member, a rotatable member connected to said driving member for rotation therewith, and retarding means coacting with said rotatable member to angularly displace said rotatable member with respect to said driving member, an improved power control mechanism comprising: a cam carried by one of said members; a cam follower carried by the other of said members; and means for moving one of said members axially toward said other member causing said cam follower to follow said cam as said members are angularly displaced with respect to one another by said retarding means, and for simultaneously releasing said retarding means to release said rotatable member.

17. The combination of claim 16 wherein the last named means comprises a lever pivotal intermediate its ends and having one end connected to said retarding means; and an inverted L-shaped element having one portion forming a yoke adapted to axially move one of said members with respect to the other of said members, and the other portion adapted to actuate said other end of said lever.

18. In a clutch mechanism for drivingly connecting a driving element rotating at a relatively constant angular velocity to a driven member, the combination of: clutch engaging parts connected to and rotatably driven by said driving element; a rotatable drum connected to said clutch engaging parts for rotation therewith; resilient means for holding said rotatable drum and said clutch engaging parts in a clutch disengaged position; retarding means coacting with said drum for reducing the angular velocity of said drum so that the angular displacement of said drum with respect to said clutch engaging parts actuates said clutch engaging parts against the bias of said resilient means to effect clutch engagement; a cam follower carried by said drum; and power control means including a cam member adapted to engage said cam follower and release said retarding means whereby the operator is able to maintain direct control over the rotative movement of the rotatable drum during the entire period of clutch engagement.

19. In a clutch mechanism for drivingly connecting a a driving element rotating at a relatively constant angular velocity to a driven member, the combination of: clutch engaging parts connected to and rotatably driven by said driving element, a rotatable drum connected to said clutch engaging parts for rotation therewith; resilient means for holding said rotatable drum and said clutch engaging parts in a clutch disengaged position; retarding means coacting with said drum for reducing the angular velocity of said drum so that the angular displacement of said drum with respect to said clutch engaging parts actuates said clutch engaging parts against the bias of said resilient means to effect clutch engagement; an axially movable cylindrical sleeve rotatably driven by said driving element and coacting with said retarding means, said sleeve having a cam member; a cam follower carried by said drum; and means for urging said sleeve and cam member axially with said cam follower following said cam member and simultaneously releasing said retarding means whereby the operator is able to maintain direct control over the rotative movement of the rotatable drum during the entire period of clutch engagement.

20. In a clutch mechanism for drivingly connecting a driving element rotating at a relatively constant angular velocity to a driven member, the combination of: clutch engaging parts connected to and rotatably driven by said driving element; a rotatable drum connected to said clutch engaging parts for rotation therewith; resilient means for holding said rotatable drum and said clutch engaging parts in a clutch disengaged position; retarding means coacting with said drum for reducing the angular velocity of said drum so that the angular displacement of said drum with respect to said clutch engaging parts actuates said clutch engaging parts against the bias of said resilient means to effect clutch engagement; an axially movable cylindrical sleeve rotatably driven by said driving element and having a peripheral groove; a pivotal L-shaped member having a portion forming a yoke partially encircling said sleeve, said yoke having cam means adapted to ride in said groove; a lever pivotal about a point intermediate its ends and having one end connected to another portion of said L-shaped member and the other end connected to said retarding means; a cam member carried by said sleeve; a cam follower carried by said drum; and manual means adapted to exert a force on said lever at its pivot point actuating said retarding means causing said drum to be angularly displaced with respect to said sleeve, said retarding force pivotally urging said lever about its pivot point to release said retarding means as said sleeve and cam member are moved by said L-shaped member axially inwardly against said cam follower.

21. In a clutch mechanism for drivingly connecting a driving element rotating at a relatively constant angular velocity to a driven member, the combination of: clutch engaging parts connected to and rotatably driven by said driving element; a rotatable member connected to said clutch engaging parts for rotation therewith; resilient means for holding said rotatable member and said clutch engaging parts in a clutch disengaged position; retarding means coacting with said rotatable member for reducing the angular velocity of said member so that the angular displacement of said member with respect to said clutch engaging parts actuates said clutch engaging parts against the bias of said resilient means to effect clutch engagement; an axially movable cylindrical sleeve rotatably driven by said driving element and coacting with said retarding means, said sleeve having a cam member defining a slope terminating in an arcuate recess; a cam follower carried by said rotatable member adapted to follow the slope of said cam member as said rotatable member is angularly displaced with respect to said sleeve and said sleeve is moved axially toward said member; said cam follower seating in said arcuate recess as said clutch becomes fully engaged to effectively lock said rotatable member and said sleeve in a fully clutch engaged position against the bias of said resilient means and to release said retarding means; and release means carried by said sleeve adapted to positively angularly displace said rotatable member with respect to said sleeve to disengage said clutch as said sleeve is axially moved away from said member.

22. The combination of claim 21 wherein said release means comprises a cam finger carried by said sleeve.

23. The combination of claim 21 wherein said cam follower comprises a rotatable roller; and said release means comprises a cam finger integrally formed with said sleeve, said finger having a camming edge which is substantially 45° normal to the axis of said clutch and spaced apart from said cam member a distance only slightly larger than the diameter of said roller.

References Cited in the file of this patent

UNITED STATES PATENTS 2,130,139    Knochl            Sept. 13, 1938

FOREIGN PATENTS 1,060,318    Germany           Nov. 18, 1953